United States Patent [19]
Meyer et al.

[11] Patent Number: 5,692,365
[45] Date of Patent: Dec. 2, 1997

[54] WRAPPING MATERIAL SUPPLY ARRANGEMENT FOR LARGE ROUND BALER

[75] Inventors: Bernard Meyer, Speyer; Juergen Moehrer, Weisenheim, both of Germany

[73] Assignee: Deere & Company, Moline, Ill.

[21] Appl. No.: 713,684

[22] Filed: Sep. 17, 1996

[30] Foreign Application Priority Data

Sep. 23, 1995 [DE] Germany .................. 195 35 478.8

[51] Int. Cl.⁶ .................................................. B65B 11/56
[52] U.S. Cl. ...................... 53/587; 53/389.3; 53/389.4
[58] Field of Search ............................ 53/116, 118, 587, 53/389.2, 389.3, 389.4, 389.5

[56] References Cited

U.S. PATENT DOCUMENTS

| | | | |
|---|---|---|---|
| 4,409,784 | 10/1983 | Van Ginhoven et al. | 53/587 X |
| 4,580,398 | 4/1986 | Pruer et al. | 53/587 X |
| 4,604,855 | 8/1986 | Krone et al. | 53/389.3 X |
| 4,676,046 | 6/1987 | Verhulst et al. | 53/389.4 X |
| 4,677,807 | 7/1987 | Verhulst et al. | 53/587 X |
| 4,697,402 | 10/1987 | Anstey et al. | 53/389.3 X |
| 4,729,213 | 3/1988 | Raes | 53/587 X |
| 4,790,125 | 12/1988 | Merritt | 53/389.4 X |
| 4,896,477 | 1/1990 | Wagstaff et al. | 53/389.3 X |
| 4,956,959 | 9/1990 | Rumph et al. | 53/389.2 X |
| 4,956,968 | 9/1990 | Underhill . | |
| 4,969,315 | 11/1990 | Ardueser et al. | 53/389.2 X |
| 5,109,652 | 5/1992 | Viaud et al. | 53/587 X |
| 5,129,207 | 7/1992 | Butler | 53/389.5 X |
| 5,181,368 | 1/1993 | Anstey et al. | 53/389.2 X |
| 5,216,873 | 6/1993 | Ratzlaff et al. | 53/389.3 X |
| 5,247,775 | 9/1993 | Viaud | 53/389.3 X |
| 5,365,836 | 11/1994 | Campbell | 53/587 X |
| 5,433,059 | 7/1995 | Kluver et al. | 53/389.3 X |

FOREIGN PATENT DOCUMENTS

| | | |
|---|---|---|
| B1-0-316-506 | 7/1991 | European Pat. Off. . |
| B1-0 503 046 | 7/1994 | European Pat. Off. . |

*Primary Examiner*—Daniel Moon

[57] ABSTRACT

A large round baler has a wrapping material supply arrangement mounted to its discharge gate adjacent an upright run of belts used for forming a bale within the baling chamber of the baler. A pair of wrapping material feed rolls are arranged with one roll being located forwardly of and above the other. The wrapping material feed rolls are located below a chamber for holding a roll of wrapping material and disposed for having wrapping material engaged with the rolls in an S-shaped or serpentine path beginning at the rear periphery of the rear roll, then extending about a lower half of the rear roll and through a nip or gripping zone between the rolls and then about an upper half of the front roll, thus leaving the rolls at the forward side of the front roll. A guide chute extends downwardly and forwardly from the forward periphery of the front roll at a relatively steep angle, the guide chute having a lower terminal end located vertically above a guide surface of a guide pan extending beneath the discharge gate in close relationship to a fore-and-aft extending run of the bale-forming belts, whereby wrapping material exiting the guide chute will gravitate to the guide surface of the guide pan. The belts move the wrapping material along the guide pan to the baling chamber for wrapping a formed bale rotating therein. A knife is provided for cutting the wrapping material at a location adjacent a lower end of the guide chute, and a resilient stop or anvil is located in the path of a cutting edge of the knife to ensure that cutting will take place along the entire length of the cutting edge. A wrapping material sensor is located for sensing when wrapping material is present in a path extending between the guide chute and a nip formed between the guide pan and the bale-forming belts.

7 Claims, 2 Drawing Sheets

WRAPPING MATERIAL SUPPLY ARRANGEMENT FOR LARGE ROUND BALER

BACKGROUND OF THE INVENTION

The invention concerns a bale wrapping material supply arrangement mounted to a discharge gate of a large round baler and including a pair of frictionally engaged wrap material feed rolls rotating in opposite directions, and at least one guide surface to guide the envelope material towards the bale-forming chamber of the baler.

EP-B1-0 503 046 discloses a large round baler with a net wrapping arrangement where the net and the net supply arrangement are located at the rear of the baler. In this case the baling chamber of the baler is formed by a multitude of belts extending parallel to each other that capture the net together with a belt conveyor downstream of two wrapping material feed rolls and guide the net to the baling chamber. A guide vane is provided between the feed rolls and the belt conveyor which deflects the net, as it emerges at the bottom between the feed rolls, towards the belt conveyor so that the latter can capture it and carry it along.

EP-B1-0 316 506 reveals a net wrapping arrangement, located at the rear of a large round baler, in which a net is drawn from a storage roll by means of two feed rolls and leaves at the bottom of the nip formed by the two rolls. After leaving the nip, a blower directs the net into engagement with an exterior surface of bale-forming belts operating to carry the net to a nip formed between the belts and a guide arrangement extending beneath the baler and along which the belts acts to carry the net to the baling chamber.

U.S. Pat. No. 4,956,968 teaches the design of a large round baler having a net supply arrangement mounted at its forward side and including two movable guide surfaces for guiding net through a slot between bale-forming belts and rolls leading into the baling chamber and is brought into contact there with the bale located in the baler.

The problem underlying the invention is seen as that of finding a wrapping material supply arrangement that results in an effective delivery of the wrapping material at low cost.

SUMMARY OF THE INVENTION

According to the present invention there is provided an improved arrangement for delivering wrapping material to the baling chamber of a large round baler.

An object of the invention is to provide a wrapping material delivery arrangement which is efficient in that it makes use of gravity in aiding the delivery of the material.

A more specific object of the invention is to provide a wrapping material delivery arrangement including a pair of feed rolls counter-rotated so as to feed net material along an S-shaped path beginning at the side of the roll most remote from the bale-forming chamber and ending at the side of the roll closest to the chamber and including a first guide extending about the top and then downwardly and parallel to a second guide at an angle from 15°–30°, but not more than 45° from the vertical, whereby it is assured that the wrapping material does not hang up in the channel formed by the guides, but falls as in a vertical chute.

Yet another specific object is to provide a wrapping material delivery arrangement, as set forth above, and further including a knife selectively movable into contact with the wrapping material, along its full width, for severing the same against an anvil or stop located adjacent the end of the channel formed by the first and second guides.

Still another object is to provide a wrapping material delivery arrangement as set forth in the immediately preceding object wherein the anvil is made of a material such as a hard rubber or is coated with hard rubber or plastic, whereby irregularities along the straight cutting edge of the knife can be equalized so that contact with the wrapping material occurs along the entire length of the knife.

These and other objects of the invention will become apparent from a reading of the ensuing description together with the appended drawings.

DESCRIPTION OF THE PREFERRED EMBODIMENT

Figure 1:
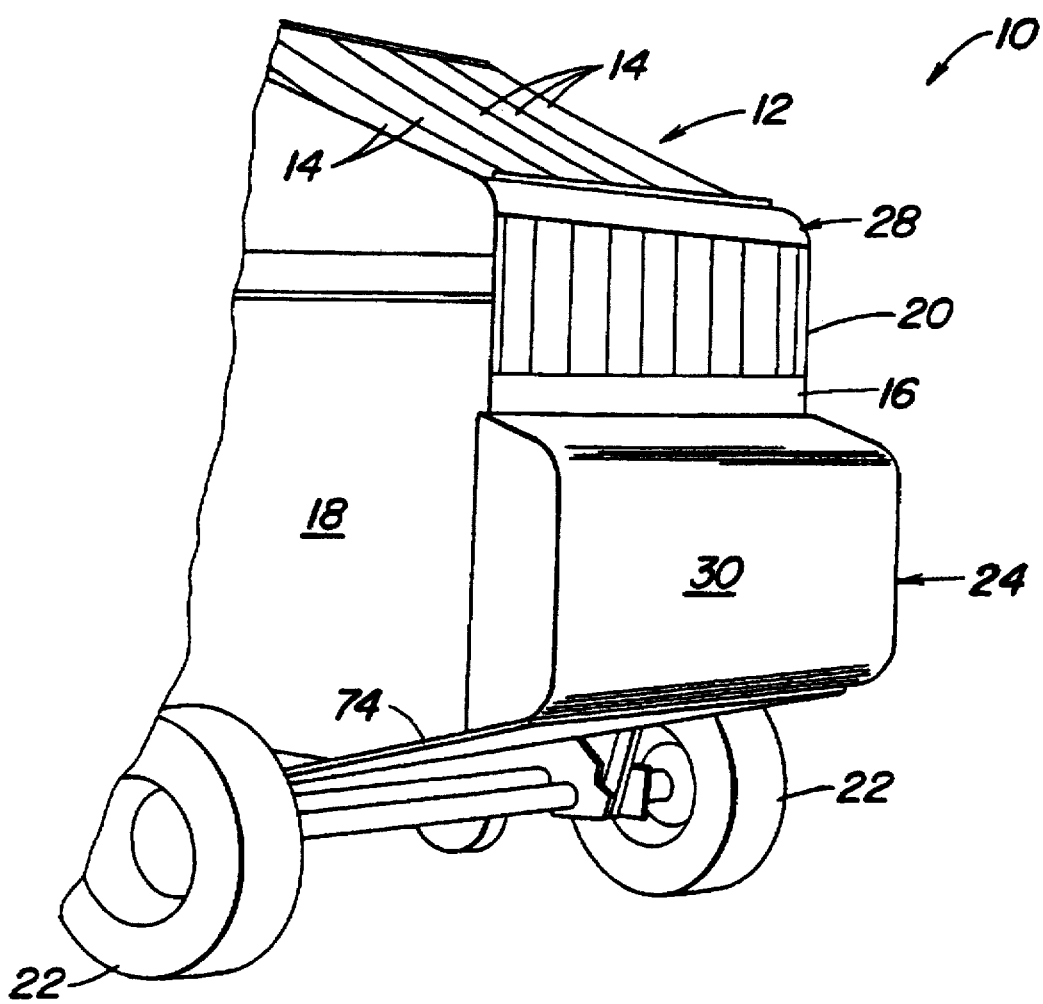
FIG. 1 shows a schematic, left rear perspective view of a baler equipped with a wrapping material supply arrangement.

A baler 10, in the form of a so-called large round baler, includes a baling chamber 12 formed in part by a conveyor arrangement defined by a plurality of belts 14 partially covered by an upright wall 16 at the rear of the baler and being mounted side-by-side between opposite side walls 18 and 20, which also form part of the baling chamber. The baler 10 is supported on a pair of ground wheels 22 so as to be able to move across the ground. The walls 16, 18 and 20 form part of a discharge gate 28 of the baler and mounted on the rear of the gate 28 adjacent the wall 16 is a wrapping arrangement 26, whose individual components are shown in FIG. 2.

The baler 10 is used to take up crop lying on the ground and to compact it into bales in order to enable handling of the crop for a further use. After the crop is compacted in the baling chamber 12, it is wrapped and deposited on the ground. The configuration of the baler 10 as a mobile round baler represents only one possible variant; the baler could also be of a type used to produce slab-shaped bales and instead of harvested crop, industrial material such as paper, rags, cotton, excelsior or the like could be wrapped. In these cases the baler could also be operated as a stationary machine.

Figure 2:
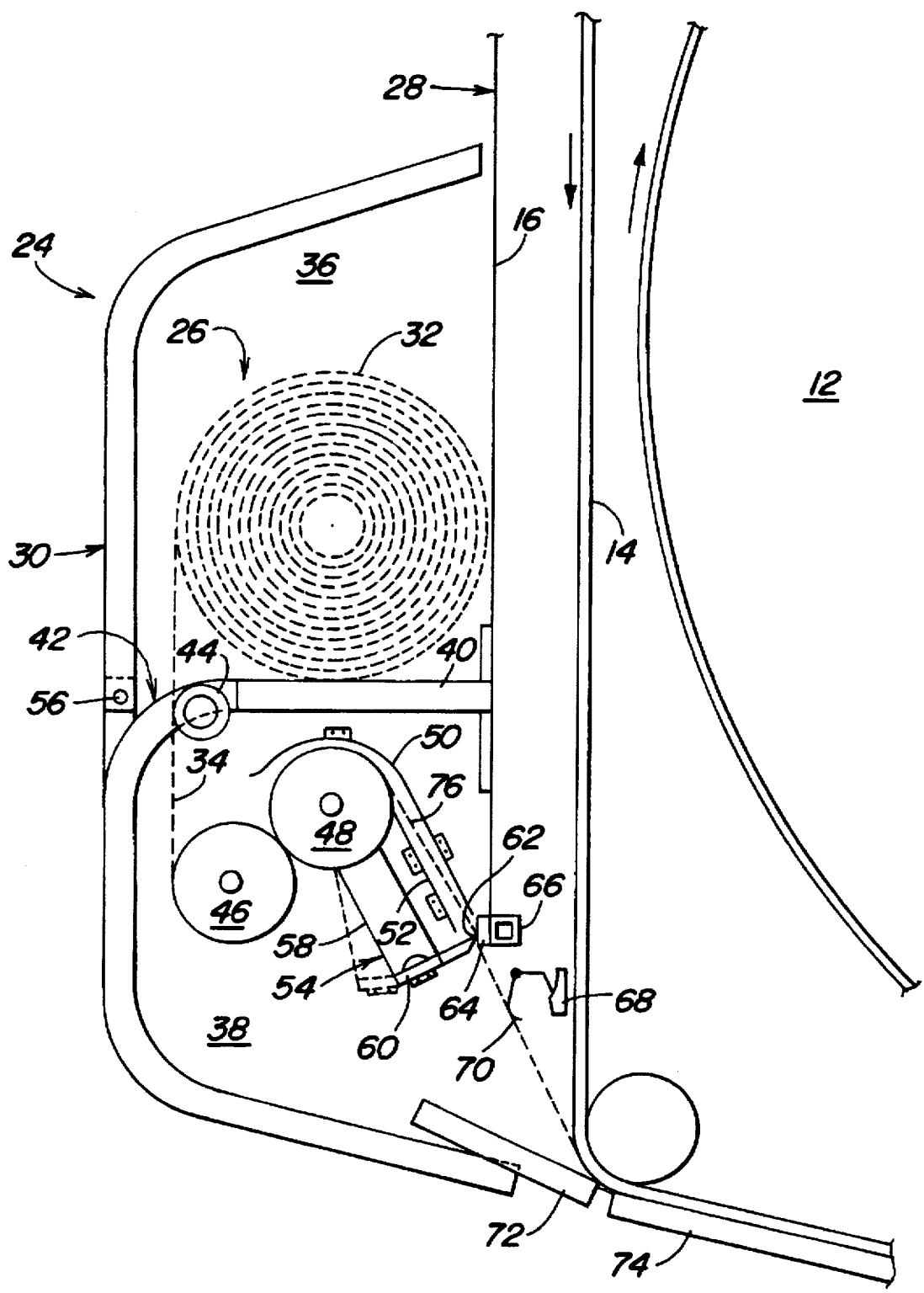
FIG. 2 is a schematic right side elevational view of the wrapping material supply arrangement.

Referring now to FIG. 2, it can be seen that the wrapping material supply arrangement 26 includes a housing or container 30 having an upper storage chamber 36 containing a roll 32 of wrapping material 34 for the sequential wrapping of a plurality of bales once they have been produced in the baling chamber 12, the wrapping material being guided into an entry point in the baling chamber in a way to be described in greater detail and wrapped around the bale, in order to prevent the latter from falling apart.

The wrapping material 34 forms a continuous path and is thin. The material 34 may be net, in particular ribbed net, foil, paper, etc. The amount or wrapping material required in each case is pulled from the roll 32 and cut off, as is known practice.

The housing 30 includes a lower material feed or conveyor chamber 38 located under and separated from the storage chamber 36 by a bottom 40 of the chamber 36, the bottom 40 terminating short of a rear wall of the container 30 so as to define a slot 42 permitting the passage of the wrapping material 34 at the rear of the bottom 40. Provided in the region of the slot 42 is a helical roll 44 over which the wrapping material 34 is drawn so that it is spread thereby.

The wrapping material supply arrangement 26 is located in rearward adjacent relationship to an upright run of the bale-forming belts 14 of the baling chamber 12, in contrast to wrapping material supply arrangements of balers having other bale-forming chamber arrangements, that are located above the baling chamber and feed the wrapping material vertically through a slot between belts, rolls, chains and the like with the aid of gravity.

The conveyor chamber 38 accommodates two wrapping material feed rolls 46 and 48, two guide plates 50 and 52, and one knife 54. In the region of the bottom 40, the container 30 is divided into two in such a way that its upper part, which defines all but the bottom 40 of the storage chamber 36, can be pivoted about a horizontal transverse hinge 56 from an open, lowered position, wherein it can accommodate the wrapping material roll 32, to a closed, raised position, as shown, during which movement a material roll 32 contained therein is lifted onto the bottom wall 40 as shown.

During the wrapping process, the feed rolls 46 and 48 have the task of drawing or pulling the wrapping material 34 from the material roll 32 and of directing it for being delivered to the baling chamber 12, where it engages and is pulled by and wrapped about a rotating bale formed in the chamber. For this purpose, the rolls 46 and 48 are arranged parallel to each other and make contact with each other with a light pressure in order to form a nip or pinch zone in the region of their circumferential surfaces for permitting passage, as well as establishing capture, of the wrapping material 34. The surface of the feed rolls 46 and 48 consists of a rubber-like coating with a high coefficient of friction. While one of the feed rolls 46 and 48 is driven by a controllable drive, not shown, the other of the rolls rotates along with it on the basis of the frictional contact. However, both rolls 46 and 48 may be driven.

The axis of rotation of the feed roll 48 is arranged forwardly and above the axis of rotation of the feed roll 46 such that the axes lie in a plane inclined at an angle of approximately 45° to the horizontal. The respective rear peripheral portions of the spiral roll 44 and of the feed roll 46 are located such that they are tangent to a substantially vertical transverse plane and an initial length of the wrap material 34 extending from the roll 32 is located along a path located in this plane, this initial length of material 34 being followed by a second length wrapped about approximately the lower half of the periphery of the feed roll 46 and then about approximately the upper half of the periphery of the feed roll 48 resulting in this second length of material 34 contacting the rolls along an S-shaped path. Then, with the rolls 46 and 48 respectively rotating clockwise and counterclockwise, the wrap material will be fed upwardly through the nip or capture zone of the rolls.

The upper guide plate 50 includes a rear portion curved concentrically above the feed roll 48, the feed roll closest to the baling chamber 12, and, hence, closest to the upright runs of the bale-forming belts 14. This guide plate 50, composed of sheet metal in this embodiment, begins at the outlet of the capture zone of the feed rolls 46 and 48 and is slightly bent upward there in such a way that the wrapping material 34 reaches its guidance region as it leaves the capture zone between the two rolls. The curved rear portion of the guide plate 50 terminates at a location spaced a short distance from a forward location of the periphery of the roll 48, and is joined there to an upper end of a forward straight portion extending tangentially therefrom at an angle of 15° to 30°, preferably 20° to the vertical. The straight portion of the guide plate 50 has a lower terminal end located adjacent the wall 16.

The lower guide plate 52, which in any case is provided for in this embodiment, is disposed parallel to and has a length approximately the same as that of the straight portion of the upper guide plate 50, with an upper end of the plate 52 beginning close to the feed roll 48 and with a lower end of the plate 52 ending close to the lower end of the plate 50. Accordingly, the two guide plates 50 and 52 cooperate to define a channel 76 between them that offers not only an unimpeded passage to the wrapping material 34 but also a reliable guidance.

In this embodiment, the knife 54 is composed of two pivot arms 58, that pivot about the axis of rotation of the feed roll 48, and a blade or cutter 60, having a cutting edge 62, joined to lower ends of the arms 58. The knife 54 is pivoted counterclockwise, at the end of the wrapping process, by conventional means (not shown), from a stand-by position, shown in dashed lines, into a cutting position, shown in solid lines. The drawing clearly shows that the pivot arms 58 are nearly vertical in both positions and thereby move the cutter 60 almost perpendicular toward the wall 16.

In their end regions remote from the feed roll 48, the pivot arms 58 are bolted to the cutter 60 in a torsionally stiff connection from which the cutter 60 with its cutting edge 62 projects forwardly far beyond the pivot arms 58 in the direction of the baling chamber 12. The knife 54 or its cutting edge 62 interacts with a stop 64 which is fastened to the wall 16 and is preferably supported on a transverse support 66. The stop 64 is so configured that it forms a firm anvil or buttress for the cutting edge 62, so that it can cut off or shear the wrapping material 34. Preferably the stop is made of material that is sufficiently pliable that it can equalize any irregularities of the cutting edge 62 along the length of the cutter 60, the transverse support 66 or the wall 16, so that the cutting edge 62 becomes effective along its entire length. For this purpose a rigid plastic or hard rubber is appropriate, that can be applied as strip, block or adhesive tape to the wall 16 or the transverse support 66. It can be seen clearly, in particular, in FIG. 2, that the path of movement of the cutting edge 62 is closely adjacent the outlet of the channel 76 between the two guide plates 50 and 52, this being an advantage but not an absolute requirement.

Mounted below the stop 64 is a sensor 68 here shown in the form of a switch having a switch element or tang 70 normally located across the path taken by the wrapping material 34 when being wrapped about a bale in the baling chamber 12. The switch element 70 moves very easily and, in the absence of contact with the wrapping material 34, extends, due to the force of gravity, in an unloaded condition into the path occupied by the wrapping material 34 during wrapping of a bale. The switch element 70 is forced upwardly from its normal position as a result of the wrapping material becoming taut when the length of wrapping material 34 extending between the feed roll 48 becomes caught in a pinch point or nip formed between the bale-forming belts 14 and a guide assembly comprising a capture vane 72, located beneath the material guide channel 76, and a contact chute 74 extending forwardly beneath the baling chamber 12 in contact with a fore-and-aft extending run of each of the bale-forming belts 14. In this way it can be detected immediately after the initiation of the wrapping process whether or not the wrapping material 34 is being fed from the storage chamber 36 to the bale located in the baling chamber 12.

The wrapping process operates as follows:

On the basis of a deliberate or automatic signal, the drive of the wrapping material feed rolls 46 and 48 and of the knife 54 are actuated with the result that the rolls counter-rotate and the knife 54 swings clockwise away from the stop 64 and the outlet of the channel 76 defined by the two guide plates 50 and 52. The directions of rotation of the feed rolls 46 and 48 are such that the wrapping material 34 is drawn off the material roll 32 and conveyed in the channel 76 between the two guide plates 50 and 52. Due to the position and the arrangement of the guide plates 50 and 52 in conjunction with the feed rolls 46 and 48, the wrapping material 34 emerges from the channel 76 at the side of the conveyor roll 48, located at the right in FIG. 2, and therefore close to the upright run of the conveyor arrangement defined by the bale-forming belts 14. After leaving the channel 76, the wrapping material 34 passes the sensor 68 and gravitates downwardly to the capture vane 72 where it slides forwardly to the nip or capture zone between the belts 14 and capture vane 72, with the belts 14 pulling the wrapping material along the guide chute 74 to the baling chamber 12. As soon as the belts 14 pull at the wrapping material 34, the wrapping material becomes taut and raises the switch element or tang 70 thus actuating the sensor 68, and a control or regulating arrangement, not shown, receives a corresponding signal. As soon as a sufficiently large part of the wrapping material 34 has been pulled off and wrapped around the baler, the drive to the feed rolls 46 and 48 is interrupted whereupon the wrapping material 34 is stretched even tighter and the knife 54 is pivoted in the counterclockwise direction until it makes contact first with the wrapping material 34 and then with the stop 64, which acts like an anvil, so that the wrapping material 34 is cut, thereby separating the portion wrapped about the bale from that extending from the roll 32.

We claim:

1. In a wrapping material supply arrangement attached to a large round baler adjacent an Upright run of a plurality of side-by-side mounted bale-forming belts and including pair of wrapping material feed rolls frictionally engaged with each other to form a capture zone, one of said pair of feed rolls having an axis of rotation located so as to be closer to said upright run of said bale-forming belts than the axis of rotation of the other of said pair of feed rolls, a guide pan located below and forwardly of said capture zone of said feed rolls and extending beneath and closely adjacent a fore-and-aft extending run of said bale-forming belts, at least one guide surface located between said pair of feed rolls and said guide pan for directing wrapping material exiting from said feed rolls toward said guide pan, the improvement comprising: said at least one guide surface having an upper end located adjacent a peripheral location of said one of said pair of feed rolls, which is closest to said upright run of bale-forming belts, and a lower end disposed at a location vertically above said guide pan, whereby said one of said pair of feed rolls when rotated in a direction for carrying material upwardly from said capture zone will act to deposit such material on said guide surface, the latter guiding the material to its lower end where it gravitates to said guide pan.

2. The wrapping material supply arrangement defined in claim 1, wherein said one of said pair of feed rolls is located above the other of said pair of feed rolls, whereby when wrap material is properly engaged with said rolls to be delivered to said guide surface it will be disposed along a serpentine path.

3. The wrapping material supply arrangement defined in claim 1 and further including a second guide surface disposed between said upright run of bale-forming belts and said at least one guide surface and cooperating with the latter to define a channel between them.

4. The wrapping material supply arrangement defined in claim 1 wherein said at least one guide surface is disposed at a small inclination to the vertical.

5. The wrapping material supply arrangement defined in claim 1 and further including a knife having at least on arm carrying a blade extending over the width of said upright run of said bale-forming belts; said at least one arm being pivotally mounted such that movement of said arm toward said upright run of said bale-forming belts will result in said knife passing closely adjacent a lower end of said at least one guide surface.

6. The wrapping material supply arrangement defined in claim 5 wherein said at least one arm is mounted for pivoting about the axis of rotation of the feed roll located closest to said upright run of said bale-forming belts.

7. The wrapping material supply arrangement defined in claim 5 and further including a non-metallic stop mounted adjacent said lower end of said at least one guide surface for engagement by said knife when the latter is swung toward said upright run of bale-forming belts; said knife having a straight-line cutting edge for contacting said non-metallic stop along the full length of said edge; and said stop having a firm but flexible surface, thereby compensating for any irregularities of said cutting edge, support for said stop, and the like.

* * * * *